United States Patent
Wang et al.

(10) Patent No.: US 11,570,089 B2
(45) Date of Patent: Jan. 31, 2023

(54) PACKET LOSS PROCESSING METHOD AND NETWORK DEVICE

(71) Applicant: HUAWEI TECHNOLOGIES CO., LTD., Guangdong (CN)

(72) Inventors: Bin Wang, Beijing (CN); Jianxi Deng, Beijing (CN); Yihong Li, Beijing (CN); Sheng Fang, Beijing (CN); Mingpu Wang, Beijing (CN); Gang Weng, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 42 days.

(21) Appl. No.: 17/357,756

(22) Filed: Jun. 24, 2021

(65) Prior Publication Data
US 2021/0409311 A1 Dec. 30, 2021

(30) Foreign Application Priority Data
Jun. 30, 2020 (CN) .......................... 202010615014.X

(51) Int. Cl.
| | |
|---|---|
| *H04L 45/02* | (2022.01) |
| *H04L 45/28* | (2022.01) |
| *H04L 45/00* | (2022.01) |
| *H04L 45/50* | (2022.01) |
| *H04L 47/32* | (2022.01) |

(52) U.S. Cl.
CPC .............. *H04L 45/28* (2013.01); *H04L 45/02* (2013.01); *H04L 45/22* (2013.01); *H04L 45/50* (2013.01); *H04L 47/32* (2013.01)

(58) Field of Classification Search
CPC ......... H04L 45/28; H04L 45/02; H04L 45/22; H04L 45/50; H04L 47/32
USPC .......................................................... 370/218
See application file for complete search history.

(56) References Cited

U.S. PATENT DOCUMENTS

| | | | | |
|---|---|---|---|---|
| 7,463,591 | B1 | 12/2008 | Kompella et al. | |
| 9,781,030 | B1* | 10/2017 | Torvi ...................... | H04L 45/50 |
| 11,057,295 | B1* | 7/2021 | Lin .......................... | H04L 45/24 |
| 11,070,468 | B1* | 7/2021 | Tripathi .................. | H04L 45/04 |
| 11,088,943 | B2* | 8/2021 | Agarwal ................. | H04L 45/28 |

(Continued)

FOREIGN PATENT DOCUMENTS

| | | |
|---|---|---|
| CN | 1983908 A | 6/2007 |
| CN | 102132525 A | 7/2011 |

(Continued)

*Primary Examiner* — Anthony Mejia
(74) *Attorney, Agent, or Firm* — Womble Bond Dickinson (US) LLP

(57) ABSTRACT

A packet loss processing method and a network device are provided. The method includes: A first node obtains a first forwarding label of a first packet, where the first packet is a discarded packet. The first node determines, based on the first forwarding label, that the first node does not have a LSP corresponding to the first forwarding label. The first node sends a first message to a second node, where the first message includes the first forwarding label, and the first message is used to indicate that the first node does not have the LSP corresponding to the first forwarding label. The second node may be, for example, a peer node of the first node. The first node sends the message to the peer node, to indicate that the first node does not have the LSP corresponding to the forwarding label.

20 Claims, 9 Drawing Sheets

(56) References Cited

U.S. PATENT DOCUMENTS

| | | | | |
|---|---|---|---|---|
| 11,233,748 B1* | 1/2022 | Deshmukh | .......... | H04L 12/5601 |
| 2003/0126287 A1* | 7/2003 | Charny | ................ | H04L 47/125 |
| | | | | 709/239 |
| 2005/0111351 A1* | 5/2005 | Shen | ........................ | H04L 45/50 |
| | | | | 370/217 |
| 2006/0146696 A1* | 7/2006 | Li | ........................... | H04L 45/00 |
| | | | | 370/218 |
| 2006/0198321 A1* | 9/2006 | Nadeau | ................... | H04L 45/50 |
| | | | | 370/254 |
| 2007/0165515 A1* | 7/2007 | Vasseur | ................. | H04L 45/502 |
| | | | | 370/216 |
| 2009/0175274 A1* | 7/2009 | Aggarwal | ........... | H04L 12/1886 |
| | | | | 370/390 |
| 2010/0284409 A1* | 11/2010 | Lv | ....................... | H04L 63/0272 |
| | | | | 370/395.31 |
| 2013/0021908 A1* | 1/2013 | Ceccarelli | ............. | H04L 47/825 |
| | | | | 370/236 |
| 2013/0077630 A1* | 3/2013 | Bejerano | ................. | H04L 45/50 |
| | | | | 370/392 |
| 2014/0280711 A1* | 9/2014 | Asati | ....................... | H04L 45/28 |
| | | | | 709/217 |
| 2014/0355423 A1* | 12/2014 | Jain | ......................... | H04L 45/22 |
| | | | | 370/228 |
| 2016/0020941 A1* | 1/2016 | Asati | ....................... | H04L 69/40 |
| | | | | 370/228 |
| 2021/0258249 A1* | 8/2021 | Torvi | ...................... | H04L 45/04 |
| 2021/0273881 A1* | 9/2021 | Peng | ....................... | H04L 45/74 |

FOREIGN PATENT DOCUMENTS

| | | | |
|---|---|---|---|
| EP | 2066074 A1 | 6/2009 | |
| WO | 2018010560 A1 | 1/2018 | |

* cited by examiner

NBR_INFO_PRIVATE object: Neighbor private information object

Length: Length    Class-Num: Class number    C-Type: Type

Enterprise Code: Enterprise code    Sub TLV: A sub-type-length-value

PACKET LOSS PROCESSING METHOD AND NETWORK DEVICE

CROSS-REFERENCE TO RELATED APPLICATIONS

This application claims priority to Chinese Patent Application No. 202010615014.X, filed on Jun. 30, 2020. The disclosure of the aforementioned application is hereby incorporated by reference in its entirety.

TECHNICAL FIELD

This application relates to the field of communications technologies, and in particular, to a packet loss processing method and a network device.

BACKGROUND

Multi-protocol label switching (MPLS) is a technology that uses a label to guide data transmission in an open communications network. Specifically, when a packet enters an MPLS network, a network device in the MPLS network allocates a corresponding label to the packet, and encapsulates the label and the packet together. Therefore, the network device may forward, in an entire forwarding process of the packet, the packet based on the label.

In the MPLS network, when a service traffic packet loss occurs in a live network, a packet loss cause needs to be quickly identified, and a service needs to be restored, to ensure normal forwarding of service traffic. Currently, when the service traffic packet loss occurs in the live network, operation and maintenance personnel usually log in to a faulty network device in the live network and a neighboring network device of the faulty network device, to collect a large amount of entry information. The operation and maintenance personnel then deduce, based on the collected information, a cause of a network device fault, and restore the network device, thereby restoring the service.

A current fault rectification manner requires the operation and maintenance personnel to collect a large amount of information and perform comparison and deduction. As a result, network rectification efficiency is low, and normal forwarding of the service may be affected for a relatively long period of time.

SUMMARY

This application provides a packet loss processing method and a network device. A first node obtains a forwarding label of a discarded packet, and sends a first message to a peer node of the first node when determining that the first node does not have a Label Switch Path (LSP) corresponding to the forwarding label. The first message includes the forwarding label, to indicate that the first node does not have the LSP corresponding to the forwarding label. In this way, the peer node is triggered to check and rectify a forwarding table based on the first message. This ensures normal forwarding of a service packet. In addition, the method is mainly automatically implemented by the network device, so that network rectification efficiency is high, and rectification timeliness is relatively good.

A first aspect of this application provides a packet loss processing method. The method includes: A first node obtains a first forwarding label of a first packet, where the first packet is a discarded packet. The first node determines, based on the first forwarding label, that the first node does not have a label switch path (LSP) corresponding to the first forwarding label. For example, the first node finds, through querying, no LSP matching the first forwarding label at a protocol layer, or finds, through querying, an LSP matching the first forwarding label but in a down state. The first node sends a first message to a second node, where the first message includes the first forwarding label, and the first message is used to indicate that the first node does not have the LSP corresponding to the first forwarding label. The second node may be, for example, a peer node of the first node.

In this solution, the first node obtains the forwarding label of the discarded packet, and sends the first message to the peer node of the first node when determining that the first node does not have the LSP corresponding to the forwarding label. The first message includes the forwarding label, to indicate that the first node does not have the LSP corresponding to the forwarding label. In this way, the peer node is triggered to check or rectify a forwarding table based on the first message. This ensures normal forwarding of a service packet. In addition, this solution is mainly automatically implemented by the node, which can reduce or avoid manual intervention. Therefore, network rectification efficiency is high.

In one embodiment, that the first node determines that the first node does not have a LSP corresponding to the first forwarding label includes: determining that the first node does not have an LSP whose incoming label is the same as the first forwarding label.

In one embodiment, when a resource reservation protocol (RSVP) is deployed on the first node, that the first node sends a first message to a second node includes: The first node determines an inbound interface corresponding to the first packet. The first node sends, based on the inbound interface, the first message to the second node corresponding to the inbound interface. There may be one or more nodes corresponding to the inbound interface, and the second node is one of the nodes corresponding to the inbound interface.

In one embodiment, when a label distribution protocol (LDP) is deployed on the first node, the first node may send the first message to all peer nodes of the first node. The peer node of the first node may be a peer node that is directly connected to the first node and on which the LDP is deployed. Alternatively, the peer node of the first node may be a peer node that is not directly connected to the first node and on which the LDP is deployed, for example, a remote peer node that is connected to the first node through another node.

In one embodiment, the method further includes: The first node obtains a second forwarding label of a second packet, where the second packet is a discarded packet. The first node determines, based on the second forwarding label, that a protocol layer of the first node has an LSP corresponding to the second forwarding label. The first node updates a forwarding table at a forwarding layer of the first node based on the LSP corresponding to the second forwarding label. In other words, entry data of the LSP that is at the protocol layer of the first node and that is corresponding to the second forwarding label may be delivered to the forwarding layer of the first node. Therefore, the forwarding table may be updated, at the forwarding layer of the first node, based on the entry data delivered at the protocol layer, to refresh and restore data that is in the forwarding table and that is corresponding to the second forwarding label. In this way, it is ensured that a packet carrying the second forwarding label can be normally forwarded at the forwarding layer of the first node.

In this solution, when determining that the protocol layer of the first node has the LSP corresponding to the forwarding label, the first node may determine that a packet loss is caused by an entry problem at the forwarding layer. Therefore, the first node delivers, from the protocol layer to the forwarding layer, the entry data of the corresponding LSP, to refresh and restore the forwarding table at the forwarding layer. This ensures normal forwarding of the service packet. The protocol layer may also be understood as a control plane, and the forwarding layer may also be understood as a forwarding plane.

In one embodiment, before a first node obtains a forwarding label of a first packet, the method further includes: The first node determines that time for continuously discarding the packet including the first forwarding label is greater than or equal to a preset duration, and the first node obtains the first packet corresponding to the forwarding label. In other words, the first node may continuously monitor whether the packet is successfully forwarded. If the first node finds, through monitoring, that the time in which the packet carrying the first forwarding label fails to be forwarded continuously is greater than or equal to the preset duration, that is, when the first node continuously discards the packet carrying the first forwarding label, the first node determines that a fault cause needs to be analyzed and checked, to promptly perform troubleshooting on a premise of ensuring system running stability.

In one embodiment, the first message is an RSVP message or an LDP message.

In one embodiment, the first message is an RSVP Hello message, the first message carries object information, and the object information includes the first forwarding label; or the first message is an LDP notification message, the first message carries a type-length-value (TLV), and the TLV includes the first forwarding label. In one embodiment, the first message further includes an address of the first node, for example, an internet protocol (IP) address. The address of the first node may also be carried in the object information of the RSVP Hello message, or carried in the TLV of the LDP notification message, to indicate an association relationship between the first forwarding label and the first node.

In one embodiment, the forwarding table includes one or more of a next hop label forwarding entry (NHLFE) table and an incoming label mapping (ILM) table.

A second aspect of this application provides a packet loss processing method. The method includes: A second node receives a first message from a first node, where the first message includes a first forwarding label, and the first message is used to indicate that the first node does not have an LSP corresponding to the first forwarding label. The second node determines that the second node does not have an LSP corresponding to the first forwarding label of the first node. The second node deletes a forwarding entry that is in the second node and that is corresponding to the first forwarding label of the first node. In this solution, the first node obtains a forwarding label of a discarded packet, and sends the first message to the second node when determining that the first node does not have the LSP corresponding to the forwarding label. The first message includes the forwarding label, to indicate that the first node does not have the LSP corresponding to the forwarding label. In this way, the second node is triggered to delete the forwarding entry based on the first message. This ensures normal forwarding of a service packet. In addition, this solution is mainly automatically implemented by the node, which can reduce or avoid manual intervention. Therefore, network rectification efficiency is high.

In one embodiment, that the second node determines that the second node does not have an LSP corresponding to the first forwarding label of the first node includes: The second node determines that the second node does not have an LSP whose outgoing label is corresponding to the first forwarding label and whose next-hop address is corresponding to an address of the first node. Alternatively, the second node determines that the second node has an LSP whose outgoing label is corresponding to the first forwarding label and whose next-hop address is corresponding to an address of the first node, where the LSP is in a down state. In this solution, with reference to various possible cases, it may be determined, in a plurality of manners, that the second node does not have the LSP corresponding to the first forwarding label and the address of the first node. This improves flexibility of implementing the solution.

In one embodiment, the method further includes: The second node receives a second message from the first node, where the second message includes a third forwarding label, and the second message is used to indicate that the first node does not have an LSP corresponding to the third forwarding label. The second node determines an LSP that is in the second node and that is corresponding to the third forwarding label of the first node. If the second node is an ingress node of the LSP (namely, the LSP corresponding to the third forwarding label of the first node), the second node reestablishes the LSP, or if the second node is not an ingress node of the LSP, the second node sends a third message to the ingress node of the LSP, where the third message is used to indicate to reestablish the LSP.

In this solution, when checking that LSP entry data of the second node is inconsistent with LSP entry data of the first node, the second node may trigger the ingress node on the LSP to reestablish the LSP. In this way, the LSP entry data of the first node and the LSP entry data of the second node are unified, and normal forwarding of the service packet is ensured.

In one embodiment, the method further includes: The second node receives a second message from the first node, where the second message includes a third forwarding label, and the second message is used to indicate that the first node does not have an LSP corresponding to the third forwarding label. The second node determines an LSP that is in the second node and that is corresponding to the third forwarding label of the first node. The second node sends a fourth message to the first node, and the fourth message is used to indicate the first node to re-advertise a forwarding label.

In this solution, when the second node checks that the LSP entry data of the second node is inconsistent with the LSP entry data of the first node, the second node may trigger the first node to reallocate and advertise a new forwarding label. In this way, the LSP entry data of the first node and the LSP entry data of the second node are unified, and normal forwarding of the service packet is ensured.

In one embodiment, the first message is an RSVP message or an LDP message.

In one embodiment, the first message is an RSVP Hello message, the first message carries object information, and the object information includes the first forwarding label. Alternatively, the first message is an LDP notification message, the first message carries a TLV, and the TLV includes the first forwarding label.

In one embodiment, the forwarding entry is included in one or more of an NHLFE table, an ILM table, and a forwarding equivalence class (FEC) table.

A third aspect of this application provides a network device, including a transceiver unit and a processing unit.

The transceiver unit is configured to obtain a first forwarding label of a first packet, where the first packet is a discarded packet. The processing unit is configured to determine, based on the first forwarding label, that a first node does not have an LSP corresponding to the first forwarding label. The transceiver unit is further configured to send a first message to a second node. The first message includes the first forwarding label, and the first message is used to indicate that the first node does not have the LSP corresponding to the first forwarding label.

In one embodiment, the processing unit is configured to determine that the first node does not have an LSP whose incoming label is the same as the first forwarding label.

In one embodiment, the processing unit is further configured to determine an inbound interface corresponding to the first packet. The transceiver unit is further configured to send, based on the inbound interface, the first message to the second node corresponding to the inbound interface.

In one embodiment, the transceiver unit is further configured to obtain a second forwarding label of a second packet, where the second packet is a discarded packet. The processing unit is further configured to determine, based on the second forwarding label, that a protocol layer of the first node has an LSP corresponding to the second forwarding label. The processing unit is further configured to update a forwarding table at a forwarding layer of the first node based on the LSP corresponding to the second forwarding label.

In one embodiment, the processing unit is further configured to determine that time for continuously discarding the packet including the first forwarding label is greater than or equal to a preset duration, and the first node obtains the first packet corresponding to the forwarding label.

In one embodiment, the first message is an RSVP message or an LDP message.

In one embodiment, the first message is an RSVP Hello message, the first message carries object information, and the object information includes the first forwarding label; or the first message is an LDP notification message, the first message carries a type-length-value (TLV), and the TLV includes the first forwarding label.

In one embodiment, the forwarding table includes one or more of a next hop label forwarding entry (NHLFE) table and an incoming label mapping (ILM) table.

A fourth aspect of this application provides a network device, including a transceiver unit and a processing unit. The transceiver unit is configured to receive a first message from a first node, where the first message includes a first forwarding label, and the first message is used to indicate that the first node does not have an LSP corresponding to the first forwarding label. The processing unit is configured to determine that a second node does not have an LSP corresponding to the first forwarding label of the first node. The processing unit is further configured to delete a forwarding entry that is in the second node and that is corresponding to the first forwarding label of the first node.

In one embodiment, the processing unit is further configured to: determine that the second node does not have an LSP whose outgoing label is corresponding to the first forwarding label and whose next-hop address is corresponding to an address of the first node; or determine that the second node has an LSP whose outgoing label is corresponding to the first forwarding label and whose next-hop address is corresponding to an address of the first node, where the LSP is in a down state.

In one embodiment, the transceiver unit is further configured to receive a second message from the first node, where the second message includes a third forwarding label, and the second message is used to indicate that the first node does not have an LSP corresponding to the third forwarding label. The processing unit is further configured to determine an LSP that is in the second node and that is corresponding to the third forwarding label of the first node and the address of the first node. If the network device is an ingress node of the LSP, the processing unit is configured to reestablish the LSP, or if the network device is not an ingress node of the LSP, the transceiver unit sends a third message to the ingress node of the LSP, where the third message is used to indicate to reestablish the LSP.

In one embodiment, the transceiver unit is further configured to receive a second message from the first node, where the second message includes a third forwarding label, and the second message is used to indicate that the first node does not have an LSP corresponding to the third forwarding label. The processing unit is further configured to determine an LSP that is in the second node and that is corresponding to the third forwarding label of the first node. The transceiver unit is further configured to send a fourth message to the first node, where the fourth message is used to indicate the first node to re-advertise a forwarding label.

In one embodiment, the first message is an RSVP message or an LDP message.

In one embodiment, the first message is an RSVP Hello message, the first message carries object information, and the object information includes the first forwarding label; or the first message is an LDP notification message, the first message carries a TLV, and the TLV includes the first forwarding label.

In one embodiment, the forwarding entry is located in one or more of an NHLFE table, an ILM table, and a forwarding equivalence class (FEC) table.

A fifth aspect of this application provides a network device. The network device includes a processor and a memory. The memory is configured to store instructions, and the processor is configured to execute the instructions in the memory, to enable the network device to perform the method according to the first aspect or the second aspect.

A sixth aspect of this application provides a network device. The network device includes a processor. The processor is coupled to a memory, and the processor is configured to execute instructions in the memory, to enable the network device to perform the method according to the first aspect or the second aspect.

A seventh aspect of this application provides a computer-readable storage medium. The computer-readable storage medium may be non-volatile. The computer-readable storage medium stores computer-readable instructions, and when the computer-readable instructions are executed by a processor, the method in any embodiment according to the first aspect or the second aspect is implemented.

An eighth aspect of this application provides a computer program product including instructions. When the computer program product is run on a computer, the computer is enabled to perform the method in any embodiment according to the first aspect or the second aspect.

A ninth aspect of this application provides a chip system. The chip system includes a processor, configured to support a network device in implementing a function in the foregoing aspect, for example, sending or processing data and/or information in the foregoing method. In a possible embodiment, the chip system further includes a memory. The memory is configured to store program instructions and data of the network device. The chip system may include a chip, or may include a chip and another discrete component.

It can be learned from the foregoing technical solutions that embodiments of this application have the following advantages.

The embodiments of this application provide the packet loss processing method and the network device. The first node obtains the forwarding label of the discarded packet, and sends the first message to the peer node of the first node when determining that the first node does not have the LSP corresponding to the forwarding label. The first message includes the forwarding label and the address of the first node, to indicate that the first node does not have the LSP corresponding to the forwarding label. In this way, the peer node is triggered to check and rectify the forwarding table based on the first message. This ensures normal forwarding of the service packet. In addition, the method is mainly automatically implemented by the node, which can reduce or avoid manual intervention. Therefore, the network rectification efficiency is high.

DESCRIPTION OF EMBODIMENTS

Figure 1:
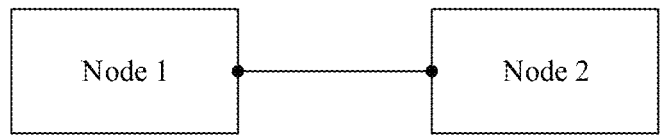
FIG. 1 is a schematic diagram of a network architecture according to an embodiment of this application.

To make objectives, technical solutions, and advantages of this application clearer, the following describes embodiments of this application with reference to accompanying drawings. It is clear that the described embodiments are merely some but not all of the embodiments of this application. A person of ordinary skill in the art may learn that, as a new application scenario emerges, the technical solutions provided in the embodiments of this application are also applicable to a similar technical problem.

In the specification, claims, and accompanying drawings of this application, the terms "first", "second", and the like are intended to distinguish between similar objects but do not necessarily indicate a particular order or sequence. It should be understood that the data termed in such a way are interchangeable in proper circumstances so that the embodiments of the present application described herein can be implemented in other orders than the order illustrated or described herein. Moreover, the terms "include", "have" and any variants thereof mean to cover non-exclusive inclusion, for example, a process, method, system, product, or device that includes a list of operations or units is not necessarily limited to those operations or units, but may include other operations or units not expressly listed or inherent to such a process, method, system, product, or device. Names or numbers of operations in this application do not mean that operations in a method procedure need to be performed according to a chronological/logical order indicated by the names or numbers. An execution sequence of the operations in the procedure that have been named or numbered may be changed based on technical objectives to be implemented, provided that a same or similar technical effect can be achieved. Division into units in this application is logical division and may be other division in an actual implementation. For example, a plurality of units may be combined or integrated into another system, or some features may be ignored or not performed. In addition, the displayed or discussed mutual couplings or direct couplings or communications connections may be implemented through some interfaces. The indirect couplings or communications connections between the units may be implemented in electronic or other forms. This is not limited in this application. In addition, units or subunits described as separate parts may or may not be physically separate, may or may not be physical units, or may be distributed in a plurality of circuit units. Some or all of the units may be selected based on actual requirements to achieve the objectives of the solutions of this application.

An MPLS technology is a common technology of an internet protocol (IP) bearer network, and is a technology that uses a label to guide data transmission in an open communications network. Usually, the MPLS network includes an ingress node, a transit node, and an egress node. The ingress node may be an ingress label edge router (LER) of a packet, and is responsible for adding a label to a packet entering an MPLS domain. The transit node may be a label switching router (LSR) in the MPLS domain, and is responsible for transporting, based on the label, the packet to the egress node along an LSP including a series of LSRs. The egress node is an egress LER of the packet, and is responsible for removing the label from the packet and forwarding the packet to a destination network.

Currently, an RSVP and an LDP are commonly used for implementing label negotiation. The two protocols require that a label is sent from an egress node to an ingress node hop by hop. Each upstream node on an LSP stores a next hop and outgoing label information whose destinations are a downstream node, to complete MPLS packet forwarding. By sending labels hop by hop, nodes in an MPLS network can map network-layer routing information such as incoming labels, next-hop nodes, and outgoing labels to a switched path at a data link layer, thereby establishing the LSP. The LSP can transmit service traffic of various public and private networks. However, when an unknown fault occurs on a node on the LSP, a service traffic packet loss may occur.

In the MPLS network, if a service traffic packet loss occurs in a live network, a packet loss cause needs to be quickly identified, and a service needs to be restored as soon as possible, to ensure normal forwarding of service traffic. Currently, when the service traffic packet loss occurs in the live network, operation and maintenance personnel usually log in to a faulty network device in the live network and a neighboring network device of the faulty network device, to collect a large amount of entry information such as entry information of an upper-layer communications protocol, entry information of a middle-layer bearer component, and entry information of bottom-layer forwarding. The operation and maintenance personnel then deduce, based on the collected information, a cause of a network device fault, and restore the network device, thereby restoring the service.

However, this fault rectification manner requires the operation and maintenance personnel to collect the large amount of information on the device and compare the information, to determine the cause of the network fault. The procedure is complex. As a result, network rectification efficiency is low, and normal forwarding of the service is affected for a long period of time.

In view of this, the embodiments of this application provide a packet loss processing method. A first node obtains a forwarding label of a discarded packet, and sends a first message to a peer node of the first node when determining that the first node does not have an LSP corresponding to the forwarding label. The first message includes the forwarding label and an address of the first node, to indicate that the first node does not have the LSP corresponding to the forwarding label. In this way, the peer node is triggered to check and rectify a forwarding table based on the first message. This ensures normal forwarding of a service packet. In addition, the method is mainly automatically implemented by the node, which can reduce or avoid manual intervention. Therefore, the network rectification efficiency is high.

FIG. 1 is a schematic diagram of a network architecture according to an embodiment of this application. As shown in FIG. 1, an MPLS network includes a node 1 and a node 2 that are connected to each other, and the node 1 and the node 2 are two nodes on an LSP. The node 1 is an upstream node device, and the node 2 is a downstream node device. The node 1 stores label information whose destination is the downstream node device (namely, the node 2), and the node 1 can forward an MPLS packet to the node 2 based on the label information. When the packet sent by the node 1 to the node 2 is lost, the node 2 obtains a discarded packet. When the node 2 determines, based on a forwarding label of the discarded packet, that a protocol layer of the node 2 does not have an LSP corresponding to the forwarding label, the node 2 may send a message to the node 1. The message includes the forwarding label and an address of the node 2, to indicate that the node 2 does not have the LSP corresponding to the forwarding label. In this way, after receiving the message, the node 1 may determine whether the node 1 has the LSP corresponding to the forwarding label. When the node 1 does not have the LSP corresponding to the forwarding label, the node 1 may delete, based on a particular situation, a forwarding table corresponding to the forwarding label, or trigger an ingress node to perform operations such as reestablishing the LSP, thereby implementing network fault rectification and ensuring normal forwarding of a service.

It may be understood that the node 1 and the node 2 may be two independent network devices, or the node 1 and the node 2 may be two units having a forwarding function in a same network device. The network device may be, for example, a digital communications device, such as a router, a switch, or a firewall, configured with the MPLS protocol. For ease of description, in the following embodiment, the packet loss processing method provided in the embodiments of this application is described in detail by using an example in which the node 1 and the node 2 are the two independent network devices.

Figure 2:
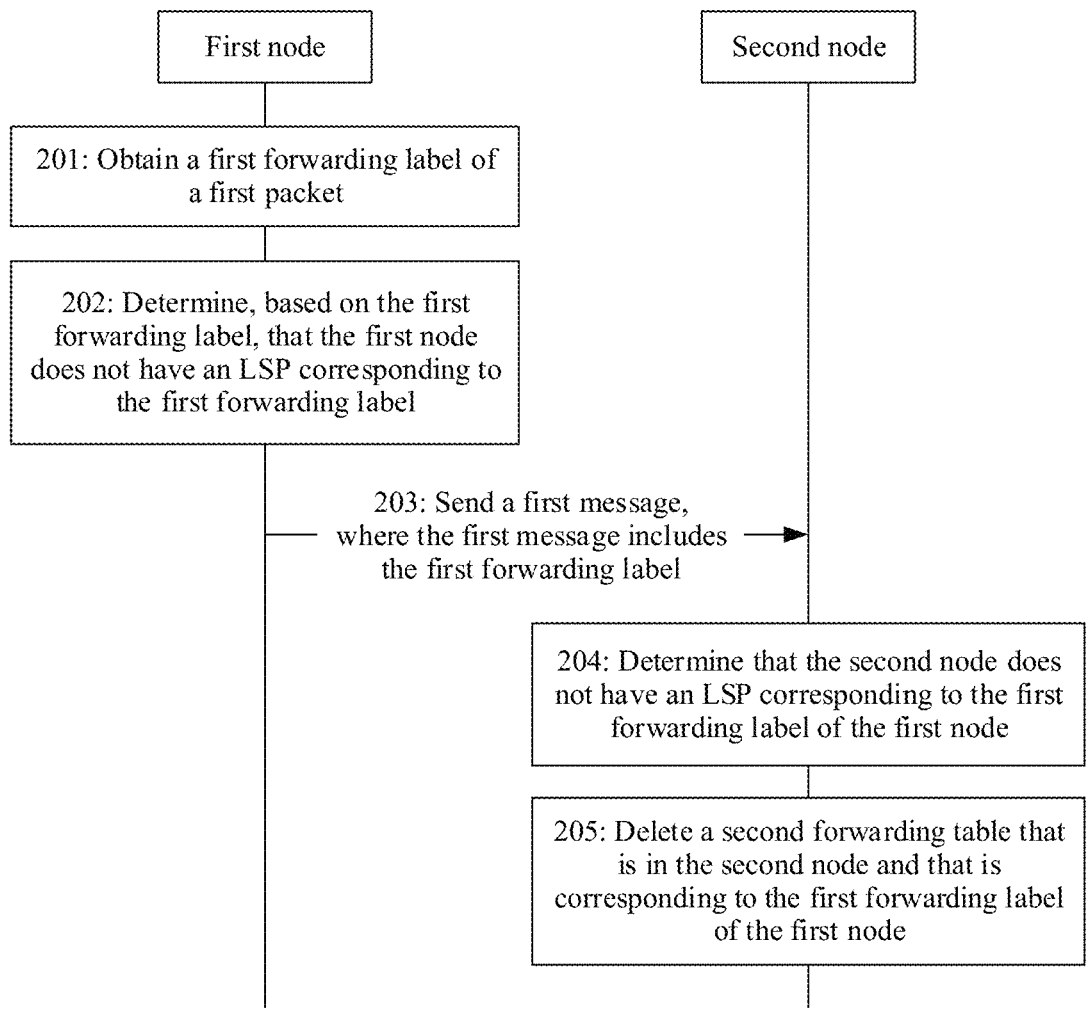
FIG. 2 is a schematic flowchart of a packet loss processing method 200 according to an embodiment of this application.

FIG. 2 is a schematic flowchart of a packet loss processing method 200 according to an embodiment of this application.

As shown in FIG. 2, the packet loss processing method 200 includes the following operations.

Operation 201: A first node obtains a first forwarding label of a first packet, where the first packet is a discarded packet.

In this embodiment, the first packet may be a packet received by the first node from another node. However, because the first node cannot successfully forward the first packet, the first node discards the first packet.

For example, when the first node receives the first packet carrying the first forwarding label, if the first node cannot find a matched forwarding table based on the first forwarding label of the first packet, the first node discards the first packet. It may be understood that, when a node forwards a packet, the node usually searches for a forwarding table in which an incoming label in the forwarding table matches a forwarding label of the packet, and forwards the packet based on a next hop in the matched forwarding table. If finding that no forwarding table matches the forwarding label of the packet, the node may consider that the forwarding label of the packet is invalid, and discard the packet.

It may be understood that, in a process in which the first node forwards the packet, the first node may also discard the received packet due to various other causes. For example, when a bit error occurs in the packet received by the first node, the first node may discard the packet. Alternatively, due to an inter-board time sequence problem, the first node may temporarily discard the packet. The foregoing packet loss causes usually cause an occasional transient packet loss, which is a normal case of packet forwarding in a network. Therefore, for the transient packet loss caused by the foregoing packet loss cause, the node does not need to be triggered to perform troubleshooting and rectification. For a packet loss that lasts for a long time, it can be considered that a fault occurs between nodes. Therefore, troubleshooting and rectification need to be triggered for the nodes.

In one embodiment, before a first node obtains a first forwarding label of a first packet, the first node may determine that time for continuously discarding the packet corresponding to the first forwarding label is greater than or equal to a preset duration, and the first node obtains the first packet corresponding to the forwarding label. In other words, the first node may continuously monitor whether the packet is successfully forwarded. If the first node finds, through monitoring, that the time in which the packet carrying the first forwarding label fails to be forwarded continuously is greater than or equal to the preset duration, that is, the first node continuously discards the packet carrying the first forwarding label, the first node may consider that continuous discarding of the packet is caused by the fault occurring between the nodes. Therefore, the first node may obtain the discarded first packet, and parse the first packet, to obtain the first forwarding label of the first packet. The preset duration may be, for example, 2 minutes or 3 minutes, and a value of the preset duration may be determined based on an actual situation. This is not limited in this embodiment.

In a possible embodiment, the first node includes a forwarding layer, and the forwarding layer is used to forward a packet. Processes such as monitoring whether the packet is successfully forwarded, obtaining the first packet, and obtaining the first forwarding label of the first packet may be executed at the forwarding layer of the first node.

Operation 202: The first node determines, based on the first forwarding label, that the first node does not have an LSP corresponding to the first forwarding label.

In a possible embodiment, the first node includes a protocol layer, and the LSP in which the first node is located is stored at the protocol layer. The first forwarding label may be sent, at the forwarding layer of the first node, to the protocol layer of the first node, and the LSP matching the first forwarding label may be queried at the protocol layer based on the first forwarding label, that is, an LSP whose incoming label in the LSP is the same as the first forwarding label is queried.

In this embodiment, when the LSP matching the first forwarding label is not found, through querying, at the protocol layer, or when an LSP matching the first forwarding label but in a down state is found, through querying, at the protocol layer, the first node may determine that the first node does not have the LSP corresponding to the first forwarding label.

Operation 203: The first node sends a first message to a second node, where the first message includes the first forwarding label, and the first message is used to indicate that the first node does not have the LSP corresponding to the first forwarding label.

In this embodiment, the second node may be an upstream node of the first node. In other words, the first packet received by the first node is sent by the second node to the first node.

In one embodiment, the first node may send the first message to all peer nodes of the first node. Because the second node is one peer node of the first node, when the first node sends the first message to all the peer nodes, it can be ensured that the second node (namely, the upstream node of the first node) can receive the first message. For example, when an LDP is deployed on the first node, the first node may send the first message to all the peer nodes of the first node. The peer node of the first node may be a peer node that is directly connected to the first node and on which the LDP is deployed. Alternatively, the peer node of the first node may be a peer node that is not directly connected to the first node and on which the LDP is deployed, for example, a remote peer (remote peer) node that is connected to the first node through another node.

In one embodiment, the first node may determine an inbound interface corresponding to the first packet; and the first node sends, based on the inbound interface, the first message to the second node corresponding to the inbound interface. There may be one or more nodes corresponding to the inbound interface, and the second node is one of the nodes corresponding to the inbound interface. When the first node sends the first message to the node corresponding to the inbound interface, it can also be ensured that the second node can receive the first message, and a range of nodes to which the first node sends the first message is reduced. This effectively saves a signaling resource of the first node. For example, when an RSVP is deployed on the first node, the first node may send the first message to the node corresponding to the inbound interface.

In an example, the inbound interface of the first packet may be obtained by parsing the first packet at the forwarding layer of the first node, and the inbound interface of the first packet is sent to the protocol layer of the first node. In this way, the first message can be sent, based on the inbound interface at the protocol layer of the first node, to the second node corresponding to the inbound interface.

Operation 204: The second node determines that the second node does not have an LSP corresponding to the first forwarding label and an address of the first node.

It may be understood that, after the second node receives the first message sent by the first node, the second node parses the first message, to obtain the first forwarding label in the first message, and may also obtain the address of the first node. In this way, the second node may query whether the second node has the LSP corresponding to the first forwarding label of the first node.

In this embodiment, the second node may determine, in a plurality of manners, that the second node does not have the LSP corresponding to the first forwarding label of the first node.

In one embodiment, the second node may determine whether an outgoing label in the LSP is corresponding to the first forwarding label (that is, whether the outgoing label in the LSP is the same as the first forwarding label), and whether a next-hop address in the LSP is corresponding to the address of the first node (that is, whether the next-hop address in the LSP is the same as the address of the first node). If determining that the second node does not have an LSP whose outgoing label is corresponding to the first forwarding label and whose next-hop address is corresponding to the address of the first node, the second node may determine that the second node does not have the LSP corresponding to the first forwarding label and the address of the first node.

In one embodiment, if determining that the second node has an LSP whose outgoing label is corresponding to the first forwarding label and whose next-hop address is corresponding to the address of the first node, where the LSP is in a down state, the second node may also determine that the second node does not have the LSP corresponding to the first forwarding label and the address of the first node.

In the foregoing two possible embodiments, a corresponding operation may be performed at a protocol layer of the second node.

Operation 205: The second node deletes a second forwarding entry that is in the second node and that is corresponding to the first forwarding label of the first node.

In this embodiment, when the second node determines that the second node does not have the LSP corresponding to the first forwarding label of the first node, the second node may consider that an entry including LSP information is inconsistent with a forwarding entry used to perform forwarding, that is, the forwarding table has a residual entry. As a result, the first packet is incorrectly forwarded to the first node. Therefore, in this case, the second node may delete the residual entry (namely, a forwarding entry that is in the second node and that is corresponding to the first forwarding label) in the forwarding table, to implement fault rectification.

In one embodiment, the protocol layer of the second node is used to receive the first message from the first node, and determine, based on the first message, that the protocol layer does not have the LSP corresponding to the first forwarding label of the first node, to further determine that the forwarding table at the forwarding layer of the second node has the residual entry. For example, when it is determined that no LSP corresponding to the first forwarding label of the first node exists at the protocol layer of the second node, indication information may be delivered, at the protocol layer of the second node, to the forwarding layer of the second node. The indication information is used to indicate that no LSP corresponding to the first forwarding label of the first node exists at the protocol layer. In this way, when the indication information is received at the forwarding layer of the second node, the forwarding entry corresponding to the first forwarding label of the first node may be deleted at the forwarding layer of the second node.

The forwarding entry is an entry belonging to one or more of an NHLFE table, an ILM table, and an FEC table.

In this embodiment, the first node obtains the forwarding label of the discarded packet, and sends the first message to the peer node of the first node when determining that the first node does not have the LSP corresponding to the forwarding label. The first message includes the forwarding label, to indicate that the first node does not have the LSP corresponding to the forwarding label. In this way, the peer node is triggered to check and rectify the forwarding table based on the first message. This ensures normal forwarding of a service packet.

The foregoing describes a process in which the second node triggers checking of the forwarding table based on the first message sent by the first node, and implements fault rectification by deleting the forwarding table that has the residual entry. The following describes in detail a process in which the second node triggers to reestablish the LSP based on a message sent by the first node, to implement fault rectification.

Figure 3:
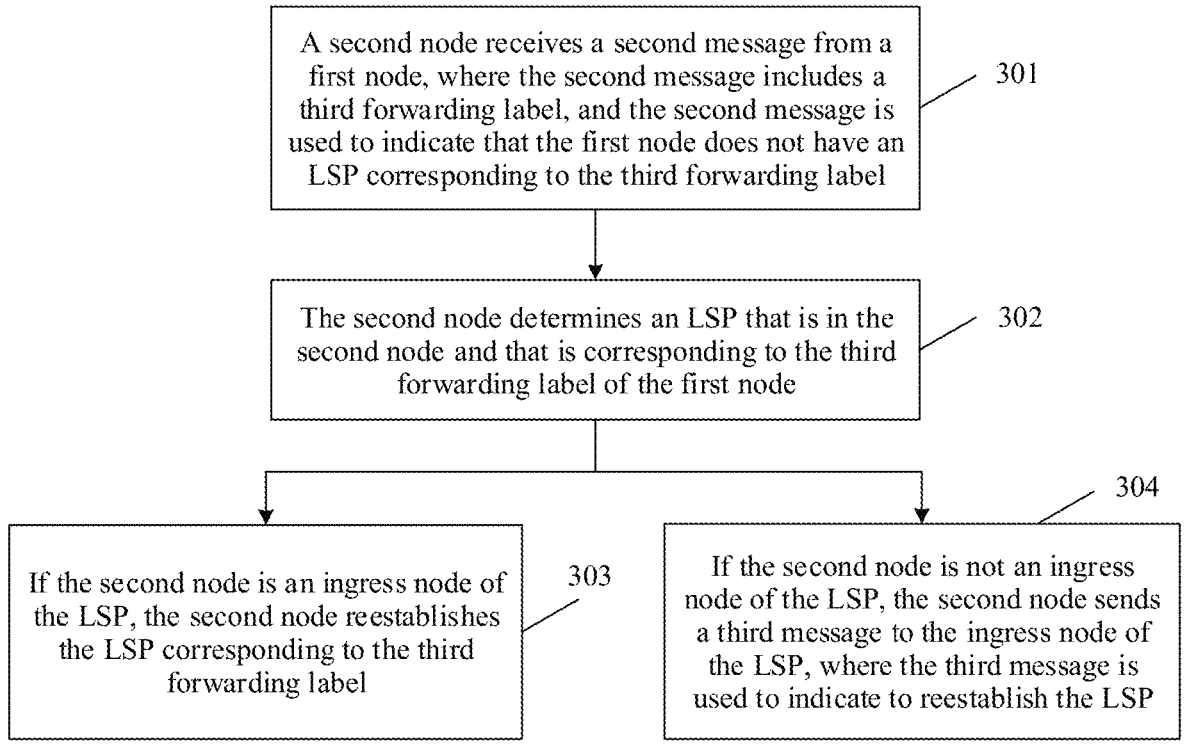
FIG. 3 is a schematic flowchart of a packet loss processing method 300 according to an embodiment of this application.

FIG. 3 is a schematic flowchart of a packet loss processing method 300 according to an embodiment of this application. As shown in FIG. 3, the packet loss processing method 300 includes the following operations.

Operation 301: The second node receives a second message from the first node, where the second message includes a third forwarding label, and the second message is used to indicate that the first node does not have an LSP corresponding to the third forwarding label.

In this embodiment, the second message sent by the first node may be sent to the second node after the first node receives a packet that is sent by the second node and that carries the third forwarding label, and continuously discards the packet. In other words, the first node may send the second message to the second node when determining that the first node does not have the LSP corresponding to the third forwarding label. In one embodiment, a process in which the first node sends the second message is similar to the foregoing operations 201 to 203. For details, refer to the foregoing operations 201 to 203. Details are not described herein again.

Operation 302: The second node determines an LSP that is in the second node and that is corresponding to the third forwarding label of the first node.

It may be understood that, similar to operation 204, the second node may determine, based on the third forwarding label in the second message, whether there is the matched LSP. Different from operation 204, in this embodiment, the second node determines the LSP that is in the second node and that is corresponding to the third forwarding label of the first node. In other words, the second node has an LSP whose outgoing label is the same as the third forwarding label and whose next-hop address is the same as the address of the first node. In one embodiment, a corresponding operation in this operation may be performed at the protocol layer of the second node. It may be understood that, if the LSP corresponding to the label may be determined by using only the third forwarding label, for example, if the third forwarding label is globally unique, the matched LSP may be determined based on the third forwarding label of the first node. In another case, the third forwarding label may not be globally unique. For example, a same third forwarding label may be allocated to different nodes. In this case, whether there is the LSP matching the third forwarding label of the first node may be determined based on the third forwarding label in the second message and the address of the first node.

Operation 303: If the second node is an ingress node of the LSP, the second node reestablishes the LSP corresponding to the third forwarding label.

An example in which operation 302 is performed at the protocol layer of the second node is still used. When it is determined that the protocol layer of the second node has the LSP corresponding to the third forwarding label of the first node, entry data of the protocol layer of the second node is consistent with entry data of the forwarding layer of the second node. However, the first node does not have the LSP corresponding to the third forwarding label. In other words, LSP entry data at the protocol layer of the first node is inconsistent with LSP entry data at the protocol layer of the second node. In this case, the LSP entry data at the protocol layer of the first node and the LSP entry data at the protocol layer of the second node need to be unified, to implement fault rectification.

In this embodiment, the RSVP is deployed on both the first node and the second node. When the second node is the ingress node of the LSP corresponding to the third forwarding label of the first node, the second node may directly trigger to reestablish the LSP, so that the first node reallocates a forwarding label and sends the forwarding label to the second node. For example, the second node may send a request message to an egress node on the LSP, to request each node in a direction from the egress node to the ingress node to send the reallocated forwarding label hop by hop, thereby unifying the LSP entry data of the first node and the LSP entry data of the second node. In addition, after the second node triggers to reestablish the LSP, the second node may delete the LSP that is at the protocol layer and that is corresponding to the third forwarding label of the first node, and delete a forwarding entry corresponding to the third forwarding label of the first node. The forwarding entry may be located at the forwarding layer.

Operation 304: If the second node is not an ingress node of the LSP, the second node sends a third message to the ingress node of the LSP, where the third message is used to indicate to reestablish the LSP.

In this embodiment, when the second node is not the ingress node of the LSP, the second node cannot directly trigger to reestablish the LSP. Therefore, the second node may send the third message to the ingress node, thereby indicating the ingress node to reestablish the LSP. Similarly, the ingress node may send a request message to an egress node on the LSP, to request each node in a direction from the egress node to the ingress node to send the reallocated forwarding label hop by hop, thereby unifying the LSP entry data of the first node and the LSP entry data of the second node. In addition, after the second node sends the third message to the ingress node, the second node may delete the LSP that is at the protocol layer and that is corresponding to the third forwarding label and the address of the first node, and delete a forwarding table that is at the forwarding layer and that is corresponding to the third forwarding label and the address of the first node.

In this embodiment, when checking that the LSP entry data of the second node is inconsistent with the LSP entry data of the first node, the second node may trigger to reestablish the LSP, thereby unifying the LSP entry data of the first node and the LSP entry data of the second node, and ensuring normal forwarding of a service packet. In addition, the method is mainly automatically implemented by the node, which can reduce or avoid manual intervention. Therefore, network rectification efficiency is high.

The foregoing describes a process in which the second node triggers to reestablish the LSP based on the message sent by the first node, to implement fault rectification. The following describes in detail a process in which the second node triggers, based on a message sent by the first node, the first node to re-advertise a forwarding label, to implement fault rectification.

Figure 4:
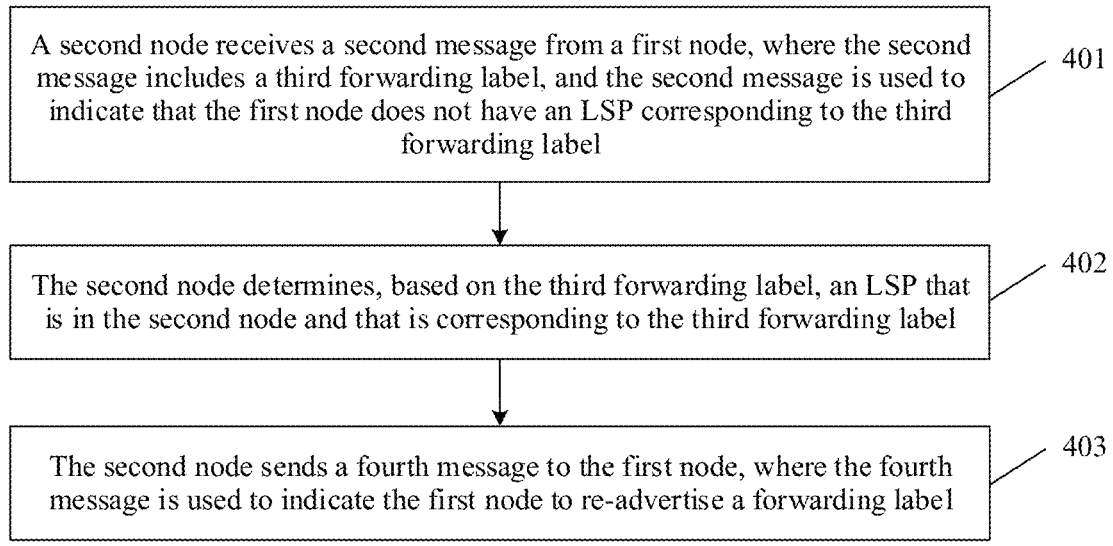
FIG. 4 is a schematic flowchart of a packet loss processing method 400 according to an embodiment of this application.

FIG. 4 is a schematic flowchart of a packet loss processing method 400 according to an embodiment of this application. As shown in FIG. 4, the packet loss processing method 400 includes the following operations.

Operation 401: The second node receives a second message from the first node, where the second message includes a third forwarding label, and the second message is used to indicate that the first node does not have an LSP corresponding to the third forwarding label.

Operation 402: The second node determines, based on the third forwarding label of the first node, an LSP that is in the second node and that is corresponding to the third forwarding label.

It may be understood that operations 401 and 402 are similar to the foregoing operations 301 and 302. For details, refer to the foregoing operations 301 and 302. Details are not described herein again.

Operation 403: The second node sends a fourth message to the first node, where the fourth message is used to indicate the first node to re-advertise a forwarding label.

In this embodiment, the LDP is deployed on both the first node and the second node. When the second node determines that LSP entry data at the protocol layer of the second node is inconsistent with LSP entry data at the protocol layer of the first node, the second node may unify the LSP entry data at the protocol layers of the two nodes by requesting the first node to re-advertise the forwarding label, thereby implementing fault rectification.

For example, the second node may send the fourth message to the first node, to indicate the first node to re-advertise a forwarding label. After receiving the fourth message, the first node may reallocate an incoming label on the LSP, and send, to the second node through a label mapping message, incoming label information reallocated by the first node. In this way, after receiving the reallocated incoming label information, the second node may update the LSP entry data at the protocol layer and the forwarding table at the forwarding layer, thereby unifying the LSP entry data of the first node and the LSP entry data of the second node. In this way, fault rectification is implemented, and normal forwarding of a service packet is ensured.

In this embodiment, when the second node checks that the LSP entry data of the second node is inconsistent with the LSP entry data of the first node, the second node may trigger the first node to reallocate and advertise a new forwarding label. In this way, the LSP entry data of the first node and the LSP entry data of the second node are unified, and normal forwarding of the service packet is ensured.

The foregoing describes in detail a process of the packet loss processing method. For ease of understanding, the following describes in detail, with reference to an example, a process in which the first node sends a message to the second node.

In one embodiment, the RSVP is configured between the first node and the second node, and the first message sent by the first node to the second node is an RSVP message. For example, the first message in the foregoing method embodiments may be, for example, an RSVP Hello message. The first node carries the forwarding label and the address of the first node in the RSVP Hello message by performing object extension on the RSVP Hello message. The address of the first node may be, for example, an IP address of the first node.

For example, a format of the RSVP Hello message before object extension is performed is as follows:
<Hello Message>::=<Common Header>
<HELLO>.

Hello Message represents the RSVP Hello message, Common Header represents a common message header, and HELLO represents particular message content in the RSVP Hello message.

A format of an RSVP Hello message obtained after object extension is performed is as follows:
<Hello Message>::=<Common Header>
<HELLO>[NBR INFO PRIVATE].

Compared with the RSVP Hello message before extension, the RSVP Hello message after extension extends a new object, and the new object may be, for example, NBR_INFO_PRIVATE. NBR_INFO_PRIVATE represents neighbor private information.

Figure 5:
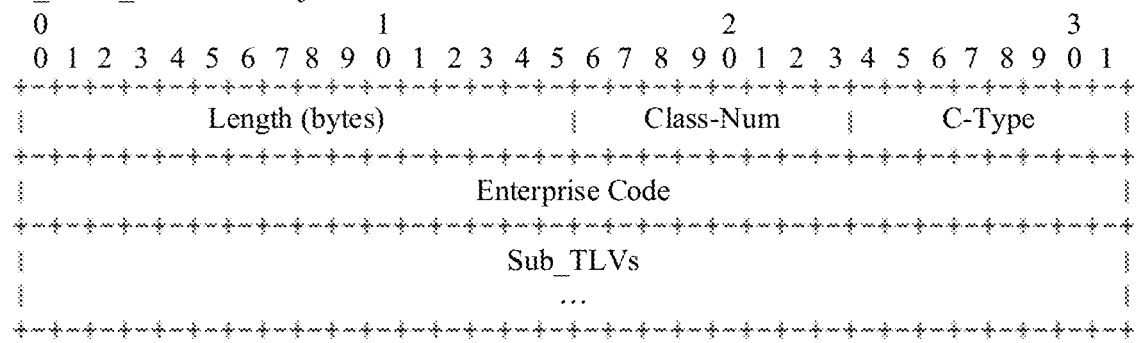
FIG. 5 is a schematic diagram of a format of information according to an embodiment of this application.

In a possible example, FIG. 5 is a schematic diagram of a format of information according to an embodiment of this application. The information may be, for example, referred to as the neighbor private information. In FIG. 5, Length represents a length of the neighbor private information, and a unit of the length is bytes. Class-Num refers to a class number, and a value of Class-Num in this embodiment may be 191. C-Type refers to a type, and a value of C-Type may be 191. The value of 191 of Class-Num and the value of 191 of C-Type are reserved, in the standard protocol, for vendors to perform private extension, and represents that the object is ignored and not forwarded and no error information is generated when an object whose value of Class-Num and value of C-Type are 191 is received and cannot be identified, to ensure object compatibility. Enterprise Code represents enterprise code. Sub TLV represents a sub-TLV, and Sub TLV may be used to encapsulate a packet loss SourceTrace parameter.

For example, the packet loss SourceTrace parameter may include a forwarding label, an IP address of the first node, an identifier of the first node, a SourceTrace request identifier, and a key of an LSP corresponding to the forwarding label. The identifier of the first node may be, for example, a label switching router (LSR) ID, a device component ID of the first node, or a loopback address of the first node, and is used to represent a node that initiates a SourceTrace request. The SourceTrace request identifier is used to represent an identifier of the RSVP Hello message sent by the first node, and the SourceTrace request is the RSVP Hello message that is sent by the first node and that is used to trigger self-checking and repairing of the second node. LSP key is used to represent an LSP determined by the first node based on the forwarding label.

Figure 6:
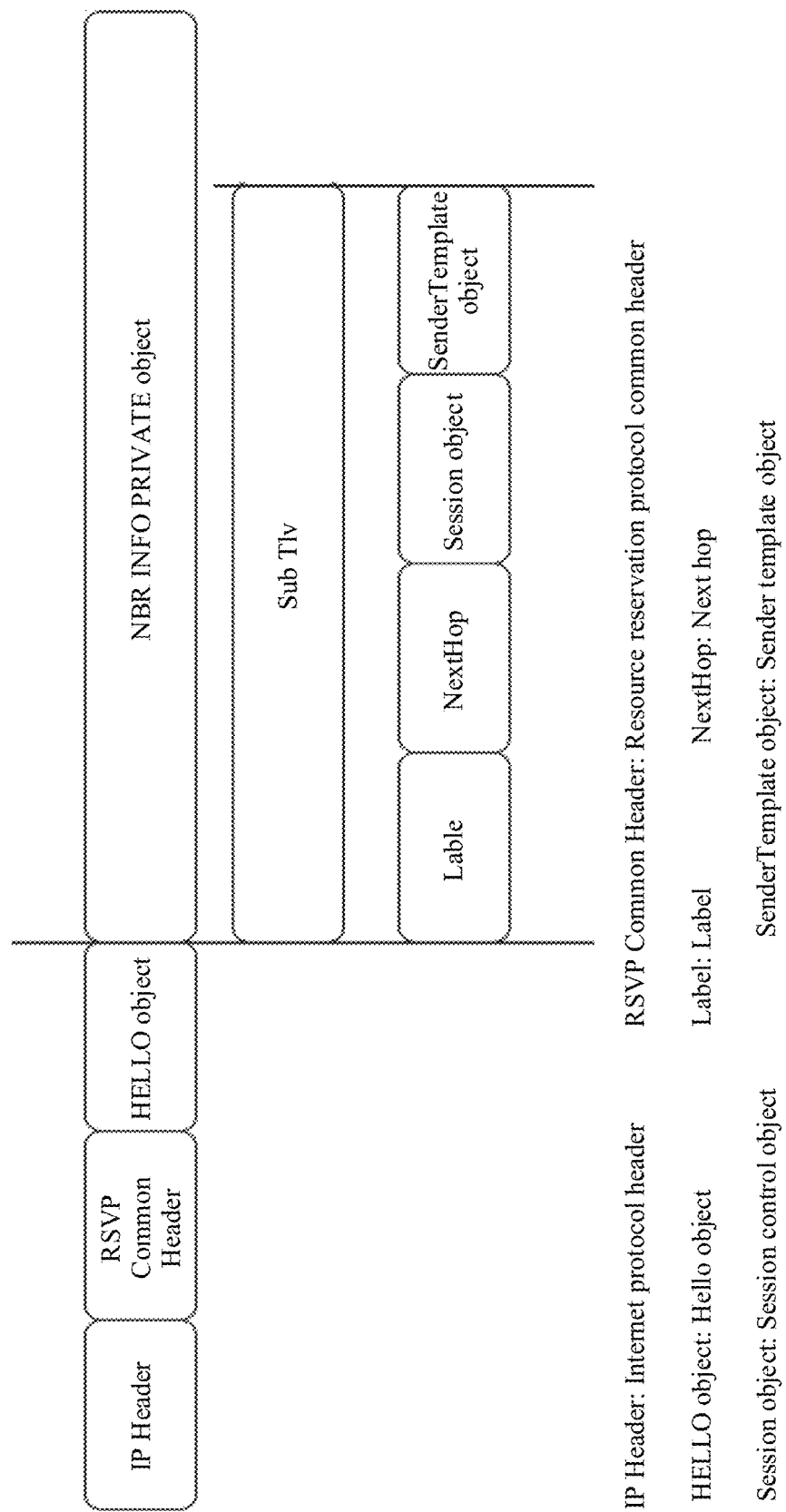
FIG. 6 is a schematic structural diagram of an RSVP Hello message according to an embodiment of this application.

In a possible example, FIG. 6 is a schematic structural diagram of an RSVP Hello message according to an embodiment of this application. As shown in FIG. 6, the RSVP Hello message includes an IP header, an RSVP common header, a Hello object, and NBR_INFO_PRIVATE. Sub TLV is encapsulated in NBR_INFO_PRIVATE, and Sub TLV includes Label, NextHop, Session, and SenderTemplate. Label represents a forwarding label. NextHop represents a next hop, and may be an address of a node that sends the RSVP Hello message. Session object and SenderTemplate object are used to jointly represent LSP key.

In one embodiment, an LDP is configured between the first node and the second node, and the first message sent by the first node to the second node is an LDP message. For example, the first message may be, for example, an LDP notification message. The first node carries the forwarding label and the address of the first node in the LDP notification message by performing TLV extension on the LDP notification message. The address of the first node may be, for example, an IP address of the first node.

Figure 7:
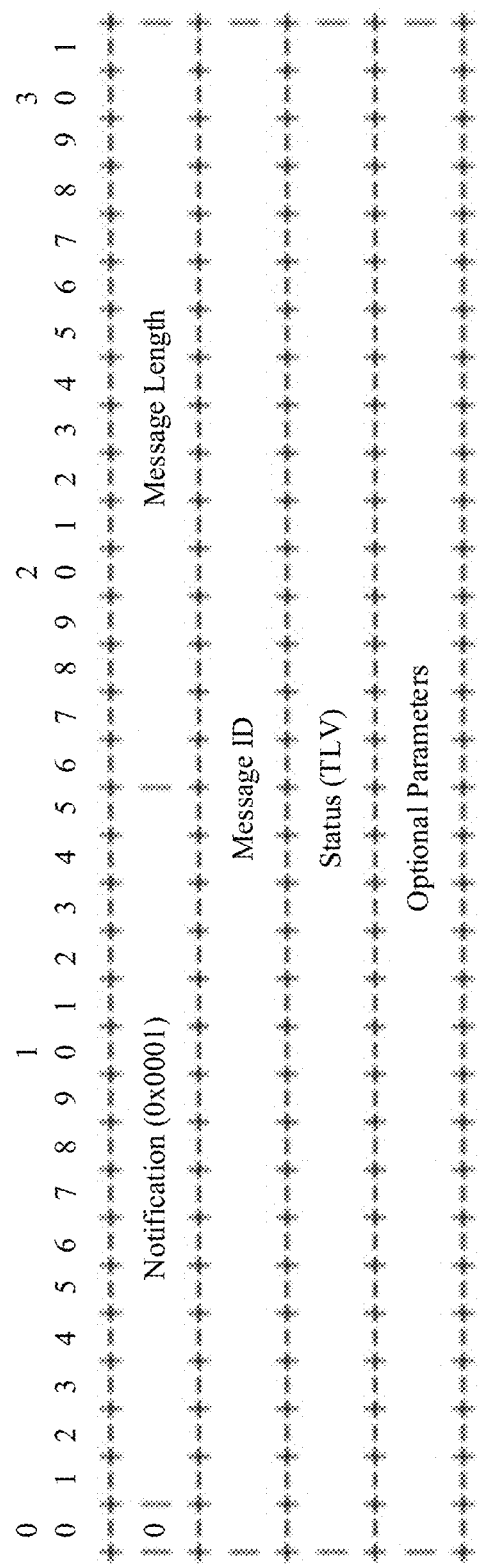
FIG. 7 is a schematic diagram of a format of an LDP notification message according to an embodiment of this application.

For example, FIG. 7 is a schematic diagram of a format of an LDP notification message according to an embodiment of this application. As shown in FIG. 7, the LDP notification message includes Message Length, Message ID, Status (TLV), and Optional Parameters. Message Length represents a length of the LDP notification message. Message ID represents an identifier of the LDP notification message, and is generated when the LDP notification message is generated. Status (TLV) represents a status TLV, and is used to represent a function of the LDP notification message. Optional Parameters represents an optional parameter, and may be used to encapsulate an LDP SourceTrace TLV. The LDP SourceTrace TLV includes a packet loss SourceTrace parameter.

Figure 8:
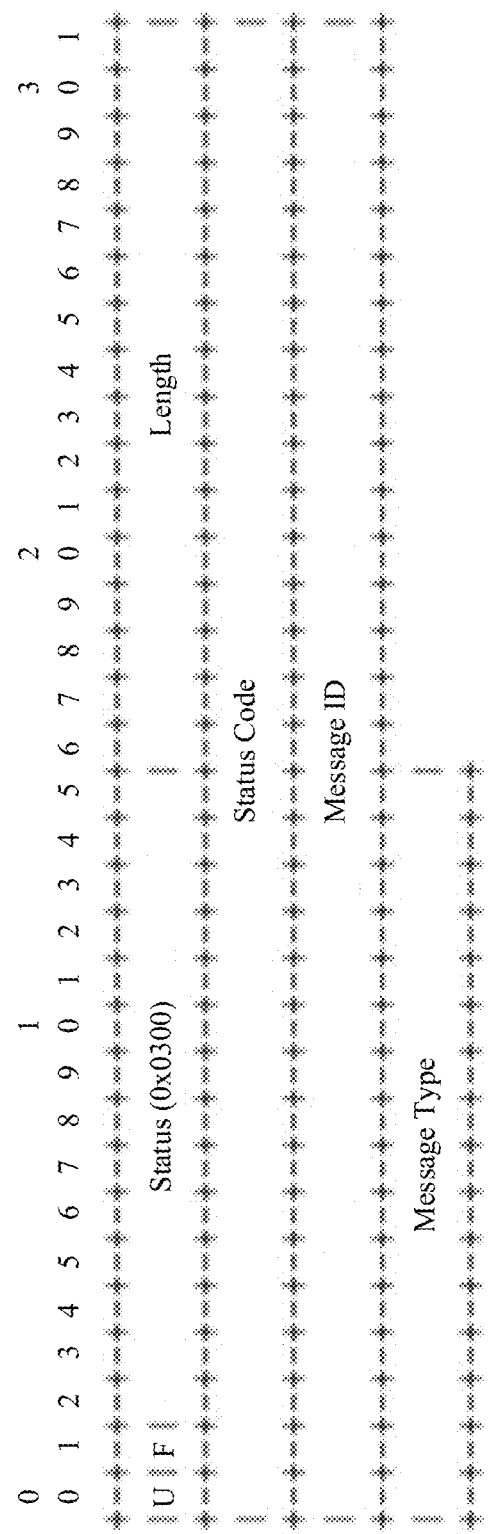
FIG. 8 is a schematic diagram of a format of Status TLV according to an embodiment of this application.

In an example, FIG. 8 is a schematic diagram of a format of Status TLV according to an embodiment of this application. As shown in FIG. 8, Status TLV includes Length, Status Code, Message ID, and Message Type. Length represents a length of Status TLV. Status Code represents status code, and is used to represent a function of the LDP notification message. A value of Message ID may be set to 0, which is used to represent that Status TLV is not triggered to be sent because of a particular protocol message. A value of Message Type may be set to 0, which is used to represent that Status TLV is not triggered to be sent currently because of a particular protocol message.

Figure 9:
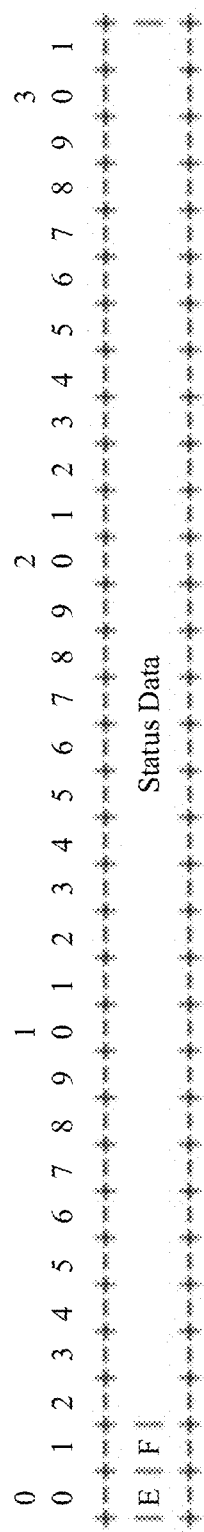
FIG. 9 is a schematic diagram of a format of Status Code according to an embodiment of this application.

FIG. 9 is a schematic diagram of a format of Status Code according to an embodiment of this application. As shown in FIG. 9, Status Code includes an E-bit, an F-bit, and Status Data. A value of the E-bit may be set to 0, which is used to represent that Status Code is not fatal error status code. A value of the F-bit may be set to 0, which is used to represent that a peer node does not need to forward the LDP notification message after receiving the LDP notification message. A value of Status Data can be set to 0x3F000EEF, which is used to represent that the LDP notification message is a message used to transmit a packet loss SourceTrace parameter.

Figure 10:
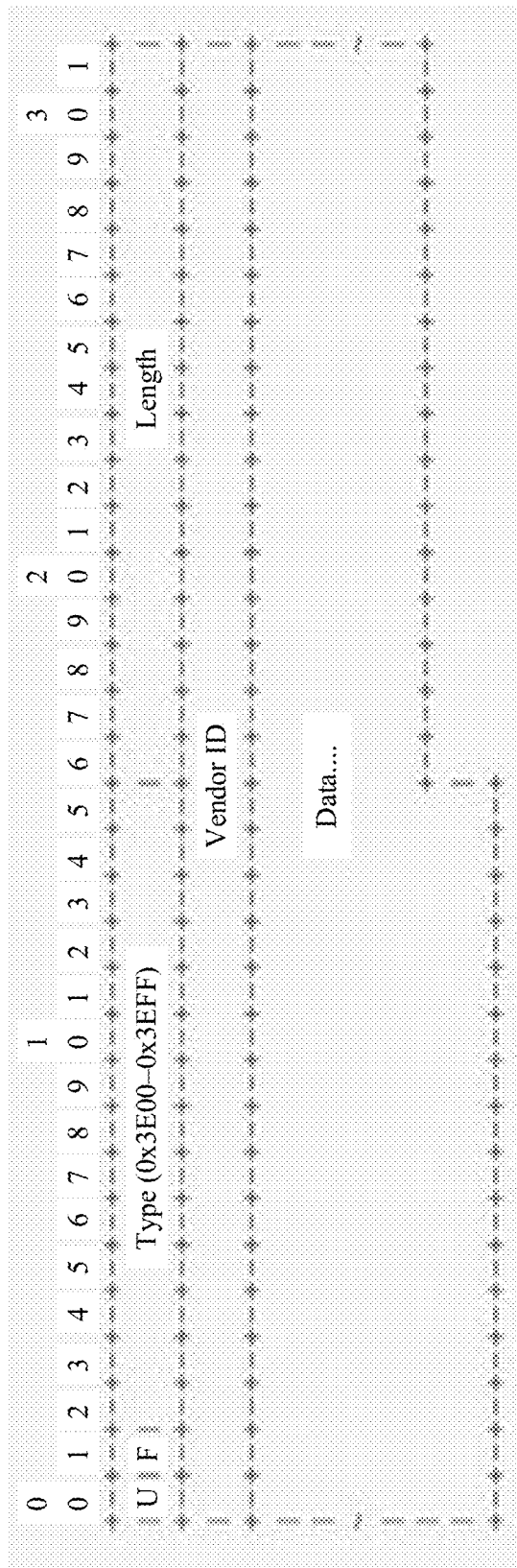
FIG. 10 is a schematic diagram of a format of an LDP SourceTrace TLV according to an embodiment of this application.

FIG. 10 is a schematic diagram of a format of an LDP SourceTrace TLV according to an embodiment of this application. As shown in FIG. 10, the LDP SourceTrace TLV includes a U-bit (Unknown TLV bit, U-bit), an F-bit (Forward unknown TLV bit, F-bit), Type, Vendor ID, and Data. A value of the U-bit may be set to 0, which is used to represent that if a peer end receives the TLV and finds that the TLV cannot be identified, the peer end needs to ignore the TLV, and continues to process a remaining part of the current message. A value of the F-bit may be set to 0, which is used to represent that a peer end receives the TLV and does not need to continue to forward a message carrying the TLV. A value of Type may be set to 0x3E0B, which is used to represent that LDP SourceTrace TLV is a private TLV used to carry a packet loss SourceTrace parameter. Vendor ID represents a vendor ID. Data is used to encapsulate the packet loss SourceTrace parameter. The packet loss SourceTrace parameter may include a forwarding label, an IP address of the first node, an identifier of the first node, a SourceTrace request identifier, and a key of an LSP corresponding to the forwarding label.

It may be understood that particular content carried in the foregoing message is merely used as an example, and in actual application, message content may be selected with reference to a particular scenario and a requirement. For example, when the forwarding label is globally unique, the RSVP Hello message may either not carry the address of the first node. Alternatively, in another case, the RSVP Hello message is carried in a packet, and the address of the first node is located at another location in the packet other than the RSVP Hello message. Alternatively, the value of C-Type in the RSVP Hello message may be another value.

The foregoing describes a process of implementing fault rectification by the first node sending the message to the second node when the first node determines that the first node does not have the LSP corresponding to the forwarding label. The following describes in detail a process of implementing fault rectification by the first node itself when the first node determines that the first node has the LSP corresponding to the forwarding label.

Figures 11, 12:
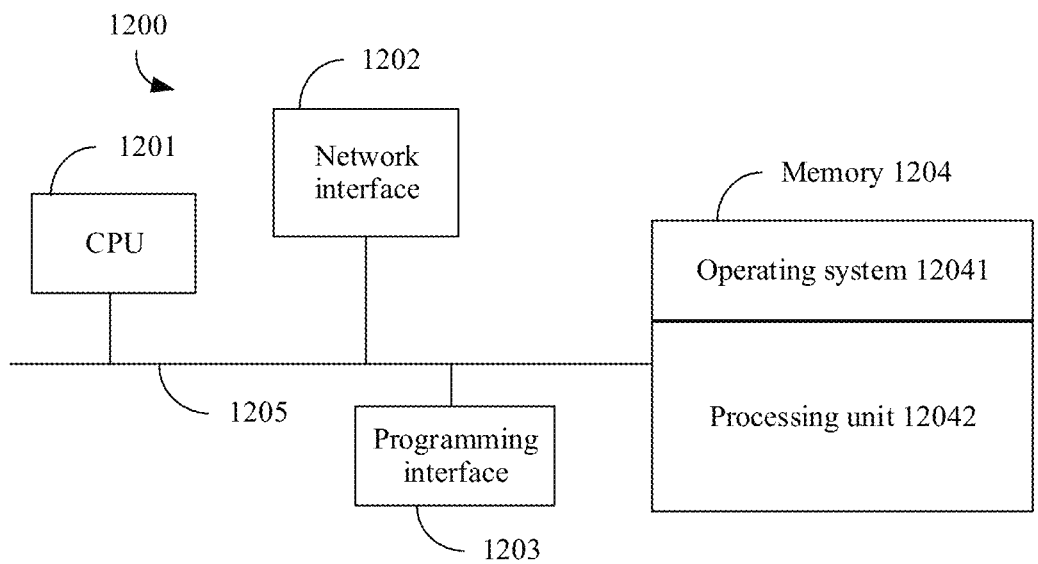
FIG. 11 is a schematic flowchart of a packet loss processing method 1100 according to an embodiment of this application.
FIG. 12 is a schematic structural diagram of a network device 1200 according to an embodiment of this application.

FIG. 11 is a schematic flowchart of a packet loss processing method 1100 according to an embodiment of this application. As shown in FIG. 11, the packet loss processing method 1100 includes the following operations.

Operation 1101: The first node obtains a second forwarding label of a second packet, where the second packet is a discarded packet.

In this embodiment, operation 1101 is similar to the foregoing operation 201. For details, refer to the foregoing operation 201. Details are not described herein again.

Operation 1102: The first node determines, based on the second forwarding label, the LSP that is in the first node and that is corresponding to the second forwarding label.

Different from operation 202, in operation 1102, the LSP matching the second forwarding label can be found at the protocol layer of the first node through querying, that is, can find, through querying, an LSP whose incoming label is the same as the second forwarding label.

In other words, the protocol layer of the first node has the LSP corresponding to the second forwarding label, but the forwarding layer of the first node does not have a forwarding table corresponding to the second forwarding label. As a result, the second packet is discarded at the forwarding layer of the first node because the forwarding layer of the first node cannot match the forwarding table corresponding to the second forwarding label.

Operation 1103: The first node updates the forwarding table in the first node based on the LSP corresponding to the second forwarding label.

In this embodiment, the entry data that is at the protocol layer of the first node and that is corresponding to the second forwarding label may be delivered to the forwarding layer of the first node. Therefore, the first forwarding table may be updated, at the forwarding layer of the first node, based on the entry data delivered at the protocol layer, to refresh and restore data that is in the forwarding table and that is corresponding to the second forwarding label. In this way, it is ensured that a packet carrying the second forwarding label can be normally forwarded at the forwarding layer of the first node.

For example, the first forwarding table may include one or more of an NHLFE table and an ILM table.

In this embodiment, when the first node determines that the protocol layer of the first node has the LSP corresponding to the forwarding label, the first node delivers the entry data of the corresponding LSP from the protocol layer to the forwarding layer, to refresh and restore the forwarding table at the forwarding layer, thereby ensuring normal forwarding of the service packet. In addition, the entire process is automatically implemented by the node, which can reduce or avoid manual intervention. Therefore, the network rectification efficiency is high.

In the foregoing embodiments, the example in which the RSVP or the LDP is deployed on the node in the network is used to describe a scenario to which the packet loss processing method provided in the embodiment of this application is applied. It may be understood that the packet loss processing method provided in the embodiments of this application may further be applied to a network scenario in which another protocol is deployed. A type of a protocol deployed in a network to which the embodiments of this application are applied is not uniquely limited herein.

To implement the foregoing embodiment, this application further provides a network device. FIG. 12 is a schematic structural diagram of a network device 1200 according to an embodiment of this application.

Although the network device 1200 shown in FIG. 12 shows some features, a person skilled in the art may be aware from the embodiments of this application that, for brevity, FIG. 12 does not show various other features, to avoid confusing more related aspects of the implementations disclosed in the embodiments of this application. For this purpose, as an example, in some implementations, the network device 1200 includes one or more processing units (CPU) 1201, a network interface 1202, a programming interface 1203, a memory 1204, and one or more communications buses 1205 that are configured to interconnect various components. In some other implementations, some functional components or units may be omitted or added to the network device 1200 based on the foregoing examples.

In some implementations, in addition to another purpose, the network interface 1202 is configured to connect to one or more other network devices/servers in a network system. In some implementations, the communications bus 1205 includes a circuit that interconnects and controls communication between system components. The memory 1204 may include a non-volatile memory, for example, a read-only memory (ROM), a programmable read-only memory (PROM), an erasable programmable read-only memory (EPROM), an electrically erasable programmable read-only memory (EEPROM), or a flash memory. The memory 1204 may also include a volatile memory. The volatile memory may be a random access memory (RAM), and is used as an external cache.

In some implementations, a non-transitory computer-readable storage medium or the memory 1204 stores the following programs, modules, and data structures, or a subset thereof, which includes an operating system 12041, a transceiver unit (not shown in the figure), and a processing unit 12042.

The operating system 12041 is used to process various basic system services and a process used to perform a hardware-related task.

In a possible embodiment, the network device 1200 may be, for example, the network device in the foregoing embodiment. The network device 1200 may include, for example, a transceiver unit and the processing unit 12042. The transceiver unit is configured to obtain a first forwarding label of a first packet, where the first packet is a discarded packet. The processing unit 12042 is configured to determine, based on the first forwarding label, that the first node does not have an LSP corresponding to the first forwarding label. The transceiver unit is further configured to send a first message to a second node. The first message includes the first forwarding label, and the first message is used to indicate that the first node does not have the LSP corresponding to the first forwarding label.

In one embodiment, the processing unit 12042 is configured to determine that the first node does not have an LSP whose incoming label is the same as the first forwarding label.

In one embodiment, the processing unit 12042 is further configured to determine an inbound interface corresponding to the first packet. The transceiver unit is further configured to send, based on the inbound interface, the first message to the second node corresponding to the inbound interface.

In one embodiment, the transceiver unit is further configured to obtain a second forwarding label of a second packet, where the second packet is a discarded packet. The processing unit 12042 is further configured to determine, based on the second forwarding label, that a protocol layer of the first node has an LSP corresponding to the second forwarding label. The processing unit 12042 is further configured to update a forwarding table at a forwarding layer of the first node based on the LSP corresponding to the second forwarding label.

In one embodiment, the processing unit 12042 is further configured to determine that time for continuously discarding the packet including the first forwarding label is greater than or equal to preset duration, and the first node obtains the first packet corresponding to the forwarding label.

In one embodiment, the first message is an RSVP message or an LDP message.

In one embodiment, the first message is an RSVP Hello message, the first message carries object information, and the object information includes the first forwarding label and an address of the first node; or the first message is an LDP notification message, the first message carries a TLV, and the TLV includes the first forwarding label and the address of the first node.

In one embodiment, the first forwarding table includes one or more of a next hop label forwarding entry NHLFE table and an incoming label mapping ILM table.

In another possible embodiment, the transceiver unit is configured to receive a first message from a first node, where the first message includes a first forwarding label and an address of the first node, and the first message is used to indicate that the first node does not have an LSP corresponding to the first forwarding label. The processing unit 12042 is configured to determine that the second node does not have an LSP corresponding to the first forwarding label of the first node. The processing unit 12042 is further configured to delete a forwarding entry that is in the second node and that is corresponding to the first forwarding label of the first node.

In one embodiment, the processing unit 12042 is further configured to: determine that the second node does not have an LSP whose outgoing label is corresponding to the first forwarding label and whose next-hop address is corresponding to an address of the first node; or determine that a protocol layer of the second node has an LSP whose outgoing label is corresponding to the first forwarding label and whose next-hop address is corresponding to an address of the first node, where the LSP is in a down state.

In one embodiment, the transceiver unit is further configured to receive a second message from the first node, where the second message includes a third forwarding label, and the second message is used to indicate that the first node does not have an LSP corresponding to the third forwarding label. The processing unit 12042 is further configured to determine an LSP that is in the second node and that is corresponding to the third forwarding label of the first node. If the network device is an ingress node of the LSP, the processing unit 12042 is configured to reestablish the LSP, or if the network device is not an ingress node of the LSP, the transceiver unit sends a third message to the ingress node of the LSP, where the third message is used to indicate to reestablish the LSP.

In one embodiment, the transceiver unit is further configured to receive a second message from the first node, where the second message includes a third forwarding label, and the second message is used to indicate that the first node does not have an LSP corresponding to the third forwarding label. The processing unit 12042 is further configured to determine an LSP that is in the second node and that is corresponding to the third forwarding label of the first node. The transceiver unit is further configured to send a fourth message to the first node, where the fourth message is used to indicate the first node to re-advertise a forwarding label.

In one embodiment, the first message is an RSVP message or an LDP message.

In one embodiment, the first message is an RSVP Hello message, the first message carries object information, and the object information includes the first forwarding label and an address of the first node; or the first message is an LDP notification message, the first message carries a TLV, and the TLV includes the first forwarding label and the address of the first node.

In one embodiment, the second forwarding table includes one or more of an NHLFE table, an ILM table, and an FEC table.

It may be understood that the foregoing function of the transceiver unit may be implemented by the processor by invoking program code in the memory, and the processor may cooperate with the network interface 1202. Alternatively, a data receiving/sending operation may be completed by the network interface 1202 on the network device 1200.

In various implementations, the network device 1200 is configured to perform the packet loss processing method provided in the embodiments of this application, for example, perform the packet loss processing method corresponding to the embodiment shown in FIG. 2, FIG. 3, FIG. 4, or FIG. 11.

The foregoing describes the embodiments of this application in detail. Operations in the methods in the embodiments of this application may be sequentially scheduled, combined, or deleted based on an actual requirement. Modules in the apparatus in the embodiments of this application may be divided, combined, or deleted based on an actual requirement.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The term "and/or" in this specification describes only an association relationship for describing associated objects and represents that there may be three relationships. For example, A and/or B may represent the following three cases: Only A exists, both A and B exist, and only B exists.

In addition, the character "/" in this specification usually indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, the units and operations in the examples described with reference to the embodiments disclosed herein may be implemented by electronic hardware, computer software, or a combination thereof. To clearly describe interchangeability between the hardware and the software, the foregoing has generally described compositions and operations of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes any medium that can store program code, for example a USB flash drive, a removable hard disk, a read-only memory, a random access memory, a magnetic disk, or an optical disc.

What is claimed is:

1. A packet loss processing method comprising:
    obtaining, by a first node, a first forwarding label of a first packet, wherein the first packet is a discarded packet;
    determining, by the first node based on the first forwarding label, that the first node does not have a label switch path (LSP) corresponding to the first forwarding label; and
    sending, by the first node, a first message to a second node, wherein the first message comprises the first forwarding label, and the first message is used to indicate that the first node does not have the LSP corresponding to the first forwarding label.

2. The packet loss processing method according to claim 1, wherein the determining that the first node does not have a label switch path (LSP) corresponding to the first forwarding label comprises:
    determining that the first node does not have an LSP whose incoming label is the same as the first forwarding label.

3. The packet loss processing method according to claim 1, wherein the sending, by the first node, a first message to a second node comprises:
    determining, by the first node, an inbound interface corresponding to the first packet; and
    sending, by the first node based on the inbound interface, the first message to the second node corresponding to the inbound interface.

4. The packet loss processing method according to claim 1, wherein the method further comprises:
    obtaining, by the first node, a second forwarding label of a second packet, wherein the second packet is a discarded packet;
    determining, by the first node based on the second forwarding label, that a protocol layer of the first node has an LSP corresponding to the second forwarding label; and
    updating, by the first node, a forwarding table at a forwarding layer of the first node based on the LSP corresponding to the second forwarding label.

5. The packet loss processing method according to claim 1, wherein before the obtaining, by a first node, a first forwarding label of a first packet, the method further comprises:
    determining, by the first node, that a time for continuously discarding the packet comprising the first forwarding label is greater than or equal to a preset duration, and obtaining, by the first node, the first packet corresponding to the first forwarding label.

6. The packet loss processing method according to claim 1, wherein the first message is a resource reservation protocol (RSVP) message or a label distribution protocol (LDP) message.

7. The packet loss processing method according to claim 6, wherein the first message is an RSVP Hello message, the first message carries object information, and the object information comprises the first forwarding label; or
    the first message is an LDP notification message, the first message carries a type-length-value (TLV), and the TLV comprises the first forwarding label.

8. The packet loss processing method according to claim 4, wherein the forwarding table comprises one or more of a next hop label forwarding entry (NHLFE) table and an incoming label mapping (ILM) table.

9. A network device comprising:
    a non-transitory memory storing instructions; and
    a processor coupled to the non-transitory memory, wherein the instructions, when executed by the processor, cause the first network device to be configured to:
    receive a first message from a first node, wherein the first message comprises a first forwarding label, and the first message is used to indicate that the first node does not have a label switch path (LSP) corresponding to the first forwarding label;
    determine, that the network device does not have an LSP corresponding to the first forwarding label of the first node; and
    delete, a forwarding entry in the network device corresponding to the first forwarding label of the first node.

10. The network device according to claim 9, wherein the instructions, when executed by the processor, further cause the network device to be configured to:
    determine that the network device does not have an LSP whose outgoing label is corresponding to the first forwarding label and whose next-hop address is corresponding to an address of the first node; or
    determine that the network device has an LSP whose outgoing label is corresponding to the first forwarding label and whose next-hop address is corresponding to an address of the first node, wherein the LSP is in a down state.

11. The network device according to claim 9, wherein the instructions, when executed by the processor, further cause the network device to be configured to:
    receive a second message from the first node, wherein the second message comprises a third forwarding label, and the second message is used to indicate that the first node does not have an LSP corresponding to the third forwarding label;
    determine an LSP that is in the network device and that is corresponding to the third forwarding label of the first node; and
    reestablish the LSP based on the network device is an ingress node of the LSP, or send a third message to an ingress node of the LSP based on the network device is not the ingress node of the LSP, wherein the third message is used to indicate to reestablish the LSP.

12. The network device according to claim 9, wherein the instructions, when executed by the processor, further cause the network device to be configured to:
    receive a second message from the first node, wherein the second message comprises a third forwarding label, and the second message is used to indicate that the first node does not have an LSP corresponding to the third forwarding label;
    determine an LSP that is in the network device and that is corresponding to the third forwarding label of the first node; and
    send a fourth message to the first node, wherein the fourth message is used to indicate the first node to re-advertise a forwarding label.

13. The network device according to claim 9, wherein the first message is an resource reservation protocol (RSVP) message or an label distribution protocol (LDP) message.

14. The network device according to claim 9, wherein the first message is an RSVP Hello message, the first message carries object information, and the object information comprises the first forwarding label; or the first message is an LDP notification message, the first message carries a type-length-value (TLV), and the TLV comprises the first forwarding label.

15. The network device according to claim 9, wherein the forwarding entry is located in one or more of an next hop label forwarding entry (NHLFE) table, an incoming label mapping (ILM) table, and a forwarding equivalence class (FEC) table.

16. A network device, comprising:
a non-transitory memory storing instructions; and
a processor coupled to the non-transitory memory, wherein the instructions, when executed by the processor, cause the first network device to be configured to:
obtain a first forwarding label of a first packet, wherein the first packet is a discarded packet;
determine based on the first forwarding label, that the network device does not have a label switch path (LSP) corresponding to the first forwarding label; and
send a first message to a second node, wherein the first message comprises the first forwarding label, and the first message is used to indicate that the network device does not have the LSP corresponding to the first forwarding label.

17. The network device according to claim 16, wherein the instructions, when executed by the processor, further cause the network device to be configured to:
determine that the network device does not have an LSP whose incoming label is the same as the first forwarding label.

18. The network device according to claim 16, wherein the instructions, when executed by the processor, further cause the network device to be configured to:
determine, an inbound interface corresponding to the first packet; and
send based on the inbound interface, the first message to the second node corresponding to the inbound interface.

19. The network device according to claim 16, wherein the instructions, when executed by the processor, further cause the network device to be configured to:
obtain a second forwarding label of a second packet, wherein the second packet is a discarded packet;
determine based on the second forwarding label, that a protocol layer of the network device has an LSP corresponding to the second forwarding label; and
update a forwarding table at a forwarding layer of the network device based on the LSP corresponding to the second forwarding label.

20. The network device according to claim 16, wherein the instructions, when executed by the processor, further cause the network device to be configured to:
determine, that a time for continuously discarding the packet comprising the first forwarding label is greater than or equal to a preset duration, and obtain the first packet corresponding to the first forwarding label.

* * * * *